United States Patent [19]

Furukawa et al.

[11] Patent Number: 4,583,172
[45] Date of Patent: Apr. 15, 1986

[54] MOTOR VEHICLE

[75] Inventors: Yoshimi Furukawa, Saitama; Shoichi Sano, Tokyo, both of Japan

[73] Assignee: Honda Giken Kogyo Kabushiki Kaisha, Tokyo, Japan

[21] Appl. No.: 559,336

[22] Filed: Dec. 8, 1983

[30] Foreign Application Priority Data

Dec. 8, 1982 [JP] Japan .............................. 57-214818
Dec. 8, 1982 [JP] Japan .............................. 57-214819
Dec. 8, 1982 [JP] Japan .............................. 57-214820

[51] Int. Cl.$^4$ ............................................. G06F 15/50
[52] U.S. Cl. ..................................... 364/424; 364/449; 340/988; 73/1 E
[58] Field of Search ............... 364/424, 426, 559, 566, 364/425, 449; 180/197, 282; 73/1 E, 862.34, 511, 178 R; 180/141, 142, 143, 79; 340/988

[56] References Cited

U.S. PATENT DOCUMENTS

| 3,719,246 | 3/1973 | Bott | 180/282 |
|---|---|---|---|
| 3,849,636 | 11/1974 | Helms | 340/988 |
| 4,055,750 | 10/1977 | Jellinek | 364/424 |
| 4,328,545 | 5/1982 | Halsall et al. | 364/424 |
| 4,367,453 | 1/1983 | Kuno et al. | 364/424 |
| 4,386,674 | 6/1983 | Sugata | 180/282 |

Primary Examiner—Gary Chin
Attorney, Agent, or Firm—Irving M. Weiner; Joseph P. Carrier; John J. Cantarella

[57] ABSTRACT

A motor vehicle including a vehicle body, a front road wheel disposed in the front part of the vehicle body, a rear road wheel disposed in the rear part of the vehicle body, an engine for driving at least either of the front and rear road wheels, and a steering wheel for steering at least either of the front and rear road wheels. To facilitate the steering operation, the motor vehicle is improved by means of a transverse sliding angle detection system for detecting the transverse sliding angle of the vehicle body, and a moving direction display unit for visually displaying the moving direction of the vehicle body on the basis of an output of the transverse sliding angle detection system.

12 Claims, 7 Drawing Figures

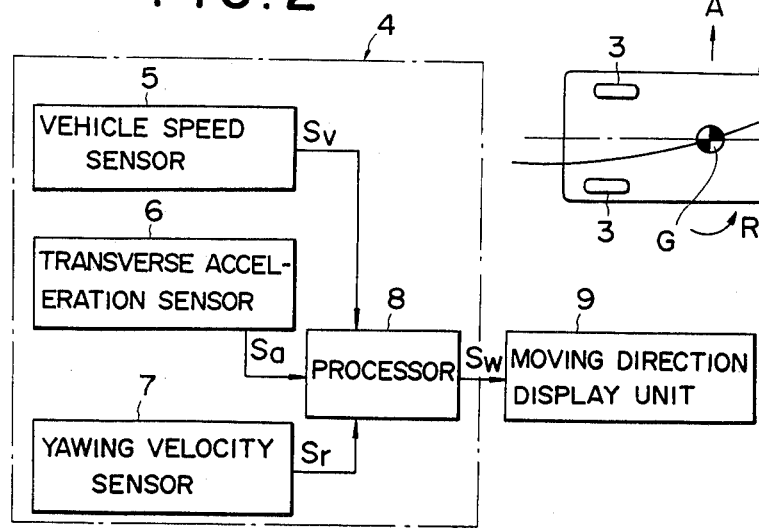
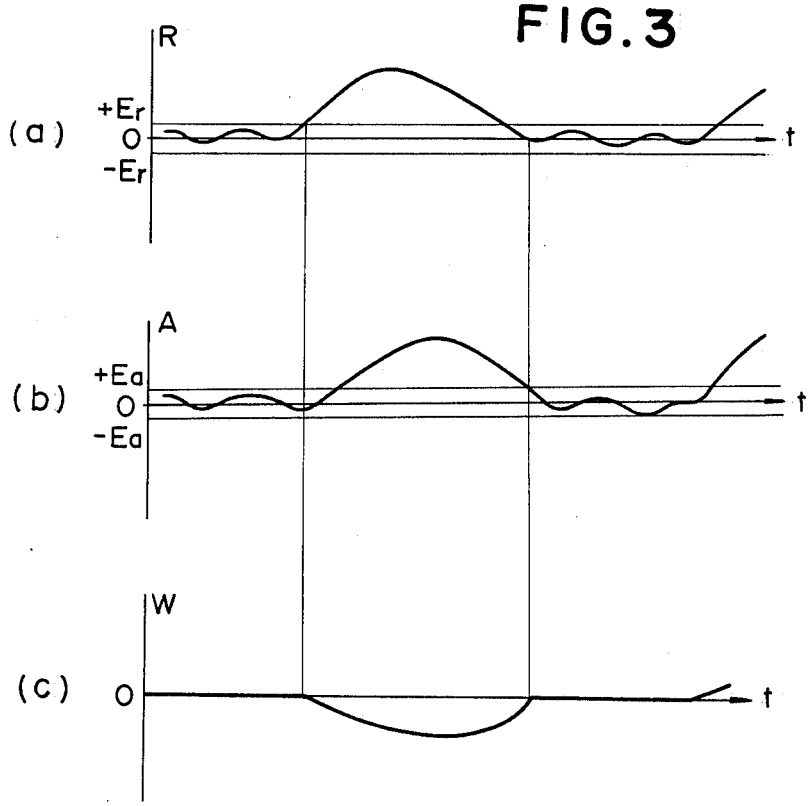

MOTOR VEHICLE

BACKGROUND OF THE INVENTION

1. Field of the Invention

The present invention relates generally to a motor vehicle. More particularly, the invention relates to a motor vehicle of the type which has a vehicle body, a front road wheel disposed in the front part of the vehicle body, a rear road wheel disposed in the rear part of the vehicle body, an engine for driving at least either of the front and rear road wheels, and a steering wheel for steering at least either of the front and rear road wheels.

2. Description of Relevant Art

There are known various motor vehicles, such as four-wheeled automobiles, of the type which includes a vehicle body, a front road wheel disposed in the front part of the vehicle body, a rear road wheel disposed in the rear part of the vehicle body, an engine for driving at least either of the front and rear road wheels, and a steering wheel for steering at least either of the front and rear road wheels.

In such a motor vehicle, when turning, the longitudinal center line of the vehicle body is not in alignment with the moving direction thereof, thus defining an angle therebetween which is generally called a transverse sliding angle of the vehicle body.

The transverse sliding angle of vehicle body always varies when the speed of the vehicle and/or the steering angle of the steering wheel change(s). As a result, when steering the vehicle, the driver has to constantly forecast the instantaneous value of the transverse sliding angle of vehicle body. The faculty of such forecast constitutes a factor in determining whether or not the driver is adept in the steering operation.

The present invention has been achieved to provide an improvement in such respect in the art of a motor vehicle.

SUMMARY OF THE INVENTION

According to the present invention, there is provided an improvement in a motor vehicle including a vehicle body, a front road wheel disposed in the front part of the vehicle body, a rear road wheel disposed in the rear part of the vehicle body, an engine for driving at least either of the front and rear road wheels, and a steering wheel for steering at least either of the front and rear road wheels, comprising a transverse sliding angle detection system for detecting the transverse sliding angle of the vehicle body, and a moving direction display unit for visually displaying the moving direction of the vehicle body on the basis of an output of the transverse sliding angle detection system.

Accordingly, an object of the present invention is to provide a motor vehicle in which the driver is favorably informed of the moving direction of the vehicle body, so that the steering operation becomes relatively easy.

The above and further features, objects and advantages of the present invention will more fully appear from the following detailed description of the preferred embodiments of the invention when the same is read in conjunction with the accompanying drawings.

BRIEF DESCRIPTION OF THE DRAWINGS

FIG. 1 is a schematic bottom view of a motor vehicle according to a first embodiment of the invention.

FIG. 2 is a block diagram showing a transverse sliding angle detection system and a moving direction display unit of the motor vehicle of FIG. 1.

FIG. 3 shows graphs for explaining the function of the transverse sliding angle detection system of FIG. 2.

DETAILED DESCRIPTION OF PREFERRED EMBODIMENTS

Figure 4:
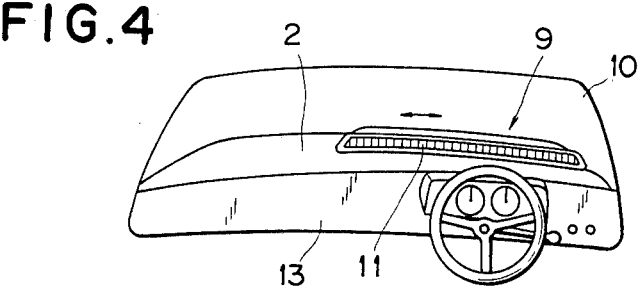
FIG. 4 is a rear view, from inside of a passenger room, of a front portion of the motor vehicle including the moving direction display unit of FIG. 2.

Referring first to FIG. 1, designated at reference numeral 1 is a vehicle body of a motor vehicle according to the first embodiment of the invention, which vehicle is powered by means of an engine (not shown) and permitted to run at various vehicle speeds ranging up to a relatively high speed. The vehicle body 1 is provided in the front part thereof with a pair of front road wheels 2, 2 steerable by means of a steering wheel (not shown), and in the rear part thereof with a pair of rear road wheels 3, 3 driven by the engine. In place of the rear road wheels 3, 3, there may be employed a pair of rear road wheels which, together with the front road wheels 2, 2, are also steerable. Moreover, the front road wheels 2, 2 may be driven by the engine.

In FIG. 1, designated at reference character G is the center of gravity of the motor vehicle. The vehicle body 1 has a longitudinal center line C thereof passing through the center of gravity G. While the motor vehicle is turning with a transverse acceleration A, the vehicle body 1 has an instantaneous moving direction D thereof making an angle W with the longitudinal centerline C, which angle W is called a transverse sliding angle. Between the transverse acceleration A and the transverse sliding angle W of the vehicle body 1, there is a relationship as follows:

$$A = V(dW/dt + R) \quad \text{(i)}$$

where,

V = the advancing speed of the motor vehicle;
R = the yawing velocity about the center of gravity G of the motor vehicle; and
t = time.

By solving the differential equation (i) with respect to the transverse sliding angle W as a function of time t:

$$W = W_0 + \int_0^t \left(\frac{A}{V} - R\right) dt \quad \text{(ii)}$$

where, $W_0$ = the initial value of the transverse sliding angle W at the time t=0.

Referring now to FIG. 2, designated at reference numeral 4 is a transverse sliding angle detection system comprising a vehicle speed sensor 5 which detects the vehicle speed V and outputs a vehicle speed signal Sv in accordance therewith, a transverse acceleration sensor 6 which detects the transverse acceleration A and outputs a transverse acceleration signal Sa in accordance therewith, a yawing velocity sensor 7 which detects the yawing velocity R and outputs a yawing velocity signal Sr in accordance therewith, and a processor 8 which receives the vehicle speed signal Sv, the transverse acceleration signal Sa and the yawing velocity signal Sr and calculates the transverse sliding angle W to output a transverse sliding angle signal Sw in accordance with the result of the calculation. The transverse sliding angle detection system 4 is provided with a moving direction display unit 9 recieving the transverse sliding angle signal Sw to visually display the moving direction D of the vehicle body 1, i.e., of the motor vehicle.

The sensors 5, 6 and 7 may be of any types which are able to electrically or optically output the signals Sv, Sa and Sr, respectively.

In the processor 8, the calculation of the transverse sliding angle W is processed by applying an integration operation based on the equation (ii) to a set of the signals Sv, Sa and Sr, with a consideration provided to eliminate the potential deviation in respective detected values of the transverse acceleration A and the yawing velocity R and to neglect relatively fine variations in the vicinity of zero degree of the transverse sliding angle W as calculated.

Namely, while the transverse acceleration A and the yawing velocity R have their values within respectively predetermined ranges in which they can be deemed to be substantially zero, the transverse sliding angle W is assumed to be zero degree. Then, at the point in time when either the transverse acceleration A or the yawing velocity R exceeds the predetermined range thereof, the integration operation of the equation (ii) is to be started by letting $t=0$ and $W_0=0$.

In other words, with reference to FIG. 3 in which graphs (a) and (b) show variations as examples of the transverse acceleration A and the yawing velocity R, respectively, for an arbitrary period of time t, there are predetermined respective threshold values $\pm Ea$ and $\pm Er$. While both the transverse acceleration A and the yawing velocity R are kept within the ranges limited by the threshold values $\pm Ea$ and $\pm Er$, respectively, the transverse sliding angle W as a function of time t is assumed to be zero degree, i.e.

$$W(t) = 0 \qquad \text{(iii)}$$

When the transverse acceleration A or the yawing velocity R goes beyond one of the threshold values $\pm Ea$ or $\pm Er$, respectively, the following integration operation is to be started in the processor 8 by letting $t=0$:

$$W(t) = \int_0^t \left( \frac{A}{V} - R \right) dt \qquad \text{(iv)}$$

As will be understood from graph (c) which gives the result of integration (iv) or W(t) based on the graphs (a) and (b), the integration (iv) is ended at the time when both the transverse acceleration A and the yawing velocity R again enter between the respective threshold values $\pm Ea$ and $\pm Er$.

In this respect, in a modified example of the first embodiment of the invention, the integration (iv) may be taken continuously with respect to the time t, whereas the transverse acceleration signal Sa and the yawing velocity signal Sr may comprise a function Fa of the transverse acceleration A and a function Fr of the yawing velocity R, respectively, such that $$Fa = \begin{cases} A \text{ for } A \text{ in } \{|A| \geq Ea\} \\ 0 \text{ for } A \text{ in } \{|A| < Ea\} \end{cases} \qquad \text{(v)}$$

$$Fr = \begin{cases} R \text{ for } R \text{ in } \{|R| \geq Er\} \\ 0 \text{ for } R \text{ in } \{|R| < Er\} \end{cases} \qquad \text{(vi)}$$

In this case, therefore, the term $(A/V-R)$ in the integration (iv) is to be given in the form of $(Fa/V-Fr)$.

Referring now to FIG. 4, the moving direction display unit 9 comprises a horizontal array of indicators 11 arranged on a bonnet 12 in front of a front windshield 10 of the motor vehicle. The indicators 11 have, in the transverse direction of the motor vehicle, positions each respectively representing, substantially directly or indirectly, one of various predetermined moving directions of the vehicle body 1, such that the nearer the position is to either end of the indicator array, the more the moving direction D is turned to the same side. The display unit 9 has a control circuit (not shown) incorporated therein to turn on no more than one or an adjacent two of the indicators 11 at a time in accordance with the transverse sliding angle signal Sw sent from the processor 8. The indicators 11 may comprise a plurality of lamps, LED's or any other light emitting elements. Moreover, the display unit 9 may alternatively be disposed on an instrument panel 13 provided in the front part of a passenger room of the motor vehicle.

Figure 5:
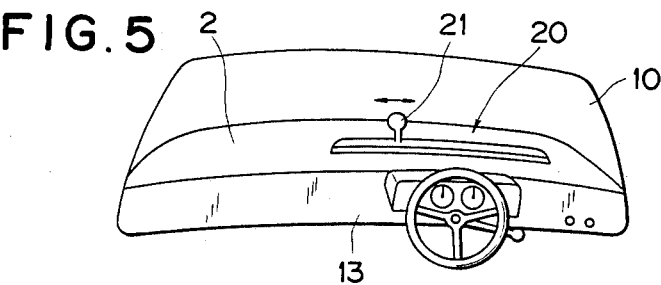
FIG. 5 is a view similar to FIG. 4, showing a moving direction display unit of a motor vehicle according to a modified example of the first embodiment.

FIG. 5 shows an essential part of a motor vehicle according to a modified example of the first embodiment of the invention, and similar components are designated by the same reference numerals. In this example, there is employed a moving direction display unit 20 comprising a target member 21 arranged on a bonnet 12 in front of a front windshield 10. The target member 21 is slidable in the transverse direction of the motor vehicle, and has its position controlled in accordance with a transverse sliding angle signal sent from a transverse sliding angle detection system, so as to substantially directly or proportionally indicate the instantaneous moving direction of the motor vehicle. Also the display unit 20 may be disposed inside of a passenger room, on an instrument panel 13 in front of a steering wheel.

Figure 6:
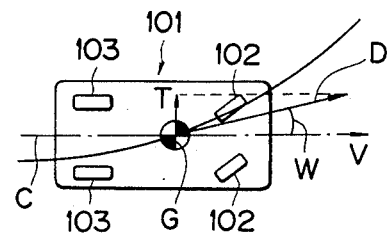
FIG. 6 is a schematic bottom view of a motor vehicle according to a second embodiment of the invention.

Referring now to FIG. 6, designated at reference numeral 101 is a vehicle body of a motor vehicle according to the second embodiment of the invention, which is powered by means of an engine (not shown) and steerable by means of a steering wheel (not shown). The vehicle body 101 is provided in the front part thereof with a pair of front road wheels 102, 102 and in the rear part thereof with a pair of rear road wheels 103, 103.

In FIG. 6, designated at reference character G is the center of gravity of the motor vehicle. The vehicle body 101 has a longitudinal center line C thereof passing through the center of gravity G. When the motor vehicle is advancing at a speed V while turning with a transverse velocity T, the vehicle body 101 has an instantaneous moving direction D thereof defining a transverse sliding angle W with the longitudinal centerline C. In general, for the vehicle speed V, the transverse velocity T and the transverse sliding angle W, there can be given an approximate equation as follows;

$$W = (T/V) \quad \text{(vii)}$$

In this embodiment, the motor vehicle has a transverse sliding angle detection system simplified by use of the approximate equation (vii) in the computation of the transverse sliding angle W.

Figure 7:
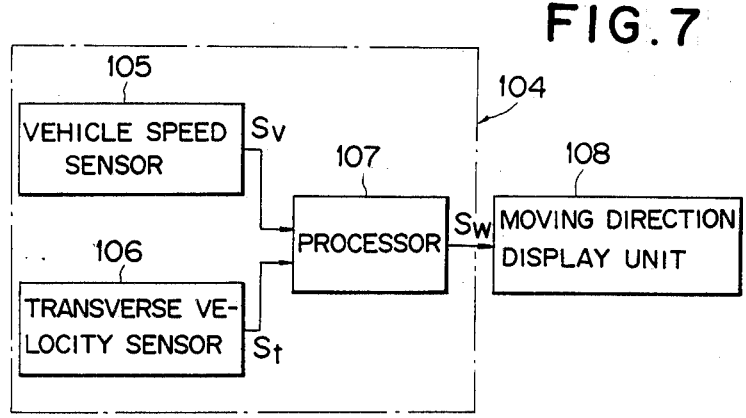
FIG. 7 is a block diagram showing a transverse sliding angle detection system and a moving direction display unit of the motor vehicle of FIG. 6.

Referring now to FIG. 7, designated at reference character 104 is the transverse sliding angle detection system, which comprises a vehicle speed sensor 105 for detecting the vehicle speed V and outputting a vehicle speed signal Sv in accordance therewith, a transverse velocity sensor 106 for detecting the transverse velocity T and outputting a transverse velocity signal St in accordance therewith, and a processor 107 for calculating the transverse sliding angle W from the signals Sv and St and outputting a transverse sliding angle signal Sw in accordance with the result of the calculation. The transverse sliding angle detection system 104 is provided with a moving direction display unit 9 recieving the transverse sliding angle signal Sw to visually display the moving direction D of the vehicle body 1.

The vehicle speed sensor 105 may be of any suitable type. The transverse velocity sensor 106 may comprise an optical sensor or a Doppler radar type.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. An improvement in a motor vehicle, including:
a vehicle body;
a front road wheel disposed in the front part of said vehicle body;
a rear road wheel disposed in the rear part of said vehicle body;
an engine for driving at least either of said front and rear road wheels; and
a steering wheel for steering at least either of said front and rear road wheels;
comprising:
   detection means connected to said vehicle for detecting the transverse sliding angle of said vehicle body; and
   display means connected to said detection means for visually displaying the moving direction of said vehicle body on the basis of an output of said detection means; and
   said detection means comprises a first sensor for detecting the advancing speed of said vehicle, a second sensor for detecting the transverse acceleration of said vehicle, a third sensor for detecting the yawing velocity of said vehicle, and a processor for calculating said transverse sliding angle on the basis of said advancing speed, said transverse acceleration and said yawing velocity.

2. A motor vehicle according to claim 1, wherein:
said processor processes an integration operation to calculate said transverse sliding angle such that $$W = \int_0^t \left( \frac{A}{V} - R \right) dt$$

where
W = said transverse sliding angle,
A = said transverse acceleration,
V = said advancing speed,
R = said yawing velocity, and
t = time.

3. A motor vehicle according to claim 2, wherein:
said integration operation has a first threshold for said transverse acceleration and a second threshold for said yawing velocity; and said processor starts said integration operation, letting t=0, when either said transverse acceleration or said yawing velocity exceeds said first threshold or said second threshold, respectively.

4. A motor vehicle according to claim 2, wherein:
said second sensor has a first threshold for said transverse acceleration;
said third sensor has a second threshold for said yawing velocity; and
said processor continuously performs said integration operation.

5. A motor vehicle according to claim 2, wherein:
said display means comprises a horizontal array of indicators.

6. A motor vehicle according to claim 2, wherein:
said display means comprises a target member slidable in the transverse direction of said vehicle.

7. A motor vehicle according to claim 2, wherein:
said display means is provided on a bonnet in front of a front windshield of said vehicle.

8. An improvement in a motor vehicle, including:
a vehicle body;
a front road wheel disposed in the front part of said vehicle body;
a rear road wheel disposed in the rear part of said vehicle body;
an engine for driving at least either of said front and rear road wheels; and
a steering wheel for steering at least either of said front and rear road wheels;
comprising:
   detection means connected to said vehicle for detecting the transverse sliding angle of said vehicle body; and
   display means connected to said detection means for visually displaying the moving direction of said vehicle body on the basis of an output of said detection means; and
   said detection means comprises a first speed sensor for detecting the advancing speed of said vehicle, a second sensor for detecting the transverse velocity of said vehicle, and a processor for calculating the transverse sliding angle on the basis of said advancing speed and said transverse velocity.

9. A motor vehicle according to claim 8, wherein:
said processor processes an algebraic operation to calculate said transverse sliding angle such that $$W = (T/V)$$

where
W = said transverse sliding angle,

V=said advancing speed, and
T=said transverse velocity.

10. A motor vehicle according to claim 8, wherein: said display means comprises a horizontal array of indicators.

11. A motor vehicle according to claim 8, wherein: said display means comprises a target member slidable in the transverse direction of said vehicle.

12. A motor vehicle according to claim 8, wherein: said display means is provided on a bonnet in front of a front windshield of said vehicle.

* * * * *